US006721790B1

(12) United States Patent
Chen

(10) Patent No.: US 6,721,790 B1
(45) Date of Patent: Apr. 13, 2004

(54) USER SETTABLE UNIFIED WORKSTATION IDENTIFICATION SYSTEM

(75) Inventor: Abraham Y. Chen, Mountain View, CA (US)

(73) Assignee: Avinta Communications, Inc, Milpitas, CA (US)

( * ) Notice: Subject to any disclaimer, the term of this patent is extended or adjusted under 35 U.S.C. 154(b) by 0 days.

(21) Appl. No.: 09/522,425

(22) Filed: Mar. 9, 2000

(51) Int. Cl.[7] ............... G06F 15/177; G06F 15/173; H04M 11/00
(52) U.S. Cl. ............... 709/220; 709/223; 709/224; 709/225; 709/226; 379/90.01; 379/93.07; 379/93.09
(58) Field of Search ............... 709/220, 223, 709/224, 225, 226; 370/257, 352, 458, 254, 264, 356, 110.1; 379/90.01, 93.07, 93.09; 375/238; 345/236, 329, 355, 146, 733–736

(56) References Cited

U.S. PATENT DOCUMENTS

| 5,008,884 | A | * | 4/1991 | Yazawa et al. | 370/110.1 |
| 5,596,631 | A | * | 1/1997 | Chen | 379/177 |
| 5,696,790 | A | * | 12/1997 | Graham et al. | 375/238 |
| 6,196,846 | B1 | * | 3/2001 | Berger et al. | 434/118 |
| 6,205,135 | B1 | * | 3/2001 | Chinni et al. | 370/356 |
| 6,424,647 | B1 | * | 7/2002 | Ng et al. | 370/352 |
| 6,430,275 | B1 | * | 8/2002 | Voit et al. | 379/114.17 |
| 6,445,682 | B1 | * | 9/2002 | Weitz | 370/257 |
| 6,539,077 | B1 | * | 3/2003 | Ranalli et al. | 379/67.1 |

OTHER PUBLICATIONS

Hamdi et al., Voice Service Interworking for PSTN and IP Networks, May 1999, IEEE, pp. 104–111.*
Acharya et al., IP Multicast Extensions for Mobile Internetworking, 1996, IEEE, pp. 67–74, vol. 1.*
Jamuar et al., Mobile Internetworking: Performance Enhancement of Mobile IP, 1999, IEEE, pp. 1764–1768, vol. 3.*

* cited by examiner

*Primary Examiner*—Sanjiv Shah
*Assistant Examiner*—Chau Nguyen

(57) ABSTRACT

A technique of assigning network addresses to workstations by using a system of unified identification codes for both voice and data communications is disclosed.

This unified identification code is settable by the user directly. This identification code can be easily verified by the user without special training. Only one set of such identification code is needed per workstation, thus simplifying the management of such networks. This technique also bridges the traditional analog voice communicattion with the emerging digital data technology.

13 Claims, 3 Drawing Sheets

Fig. 3

TCP/IP PROPERTIES OF DATA TERMINAL 120

| 301 IP ADDRESS | 305 192.168.0.155 |
|---|---|
| 302 SUBNET MASK | 306 255.255.255.0 |
| 303 GATEWAY | 307 192.168.0.234 |
| 304 DNS | 308 192.168.0.234 |

USER SETTABLE UNIFIED WORKSTATION IDENTIFICATION SYSTEM

BACKGROUND OF THE INVENTION

1. Technical Field

This invention relates to enhancement of on-premises networking equipment's addressing system.

2. Description of the Related Art

When multiple data processing equipments and/or computing devices are interconnected to form a Local Area Network (LAN), each has to have an unique Network Address so that information can be routed to the intended terminal. When a LAN is interconnected with others through Wide Area Network (WAN) such as Internet, each LAN has to be assigned with an Internet Protocol Address (IP Address) for similar purpose. Both of these systems have been using an uniform identification format of four decimal numbers each ranging from 0 to 255, separated by the symbol "." (period). Thus, this has been referred to as the "Dotted-Decimal" notation.

Each LAN would also designate one or more of its nodes as "Gateway" for the purpose of communicating with other LANs through the WAN. Consequently, the rest of terminals in the LAN have to be aware of the Gateway's Network Address within the LAN, so that traffic to other LANs can be funneled through the Gateway.

In addition, to distinguish and route WAN and LAN traffic among LANs and within a LAN, respectively, a SubNet Mask is used to segregate the IP Address information in messages. Although it functions based on binary algebra of utilizing "0" & "1" for screening, this Mask is also presented in the Dotted-Decimal notation.

Furthermore, certain terminal (or node) in a LAN or a WAN maintains a database that is capable of translating a terminal's IP Address to a alpha-numerical name, or vice versa. They are known as DNS (Domain Name Server). This is important because human users would prefer to specify terminals by names that have some meaning, not by the Dotted-Decimal IP Address that is concise for data processing equipment. A terminal without such facility, would need to be pre-stored with an IP Address that points to a DNS to function properly. Normally in a LAN, the DNS will be the Gateway, because it is the most logical candidate to possess such capability. Even if it does not have a database, it has the most direct access to a DNS in the WAN by virtue of the network architecture.

All combined, these four sets of Dotted-Decimal numbers, which are commonly referred to in the art as TCP/IP (Transmission Control Protocol/Internet Protocol) Properties, are very important parameters for the proper operation of data WANs and LANs. However, they are rather meaningless numbers for human users.

Traditionally, data WANs and LANs are set up and maintained by specially trained personnels with job titles such as Network Manager or Network Administrator who deal with the TCP/IP Properties daily. The IP Address of Internet nodes is coordinated by organizations such as Network Solutions <www.networksolutions.com>. The end users of the data equipments, however, have very little knowledge about these network parameters. To them, this is a somewhat mysterious subject.

A close analogy can be found in conventional voice communication. Telephone company has been assigning a Directory Number (commonly known as the "telephone number") to each subscriber for routing telephone calls through Public Switched Telephone Network (PSTN). For business entities of significant size, additional local switching equipment such as Private Branch eXchange (PBX) or Private Automatic Branch exchange (PABX), would be used. Each worker is assigned an Extension Number within the business so that telephone calls can be further routed to an individual's desk, directly.

PSTN service has always been offered by telephone operating companies with specially trained staff. Full time organizations under the supervision of FCC (Federal Communications Commission) administrate the nation-wide DNs. A business' PBX (or PABX) has traditionally been maintained by a Telecom Manager whose duties include assigning and maintaining a consistent set of Extension Numbers.

As the PBX and LAN technologies mature, the equipment itself has become affordable to small business and homes. Thus, SOHO (Small Office Home Office) has become the emerging market for these products. However, their installation and maintenance practices still require significant technical know-how.

One of them is the assignment and maintenance of the IP Address in a LAN and the Extension Number in a PBX. Unique identification codes need be assigned to all users for a LAN or a PBX to begin to function. If these numbers are not properly managed, operation of these systems can easily be disrupted.

This has been one of the major impedances for these products to enter the SOHO market. The potential customers can not afford a Network or Telecom manager. Yet, they are simply scared by the extensive efforts required to own such systems by larger business.

The Extension Number in a PBX is not as difficult a subject as the IP Address in a LAN, because the Extension Numbers are published in a business' directory and are being used in daily operation. It is relatively easy to correlate such a number to a co-worker's name. The IP address of a data processing equipment, on the other hand, is too remote to most people.

The advent of Distributed PABX (DPABX) (U.S. Pat. No. 5,596,631) and HomePNA (Home Phone Network Alliance) (U.S. Pat. No. 5,696,790), both being modular in device construction and peer-to-peer in network architecture, has made these products one step closer to the consumer market where more capable and efficient communication, both voice and data, is in fast growing demand.

Both of these products consist of identical modules at each location where service is desired. The modules are interconnected via a single pair of traditional telephone wires. There is no central or master unit in the system. The modules address one another based on an identification code assigned to each. These basic characteristics allow a SOHO owner to add, move or disconnect a module easily. Furthermore, a failed module with a critical application can be quickly replaced by another one of lesser importance, minimizing the disruption to business. Thus, the need for Telecom or Network Manager could be avoided.

The DPABX control modules are designed with "subscriber settable ID switches" which allow an user to assign an Extension Number to a control module by simply changing the ID switches to a new combination. The validity of the chosen Extension Number can be verified easily by making an intercom call to this number. For example, if this latest choice is a duplication of an existing assignment, the other telephone extension in the network would also be alerted by this test call. A different number combination should then be assigned to this last control module. The verification process is repeated until an available Extension Number is identified. Equipped with this simple procedure, this system is fully ready for consumer market.

The HomePNA Adapters, on the other hand, are still evolving from its data LAN origin. Among other parameters that may affect their operation, the setting of "IP Address" is still a nontrivial task reserved for the experienced.

One approach of attempting to ease this difficulty has been practiced in the LAN technology for some time. It is termed DHCP (Dynamic Host Configuration Protocol). It enables the Gateway of a LAN to automatically assign a set of values to a Client as its IP Address. This relieves the burden on the Network Manager who has to oversee the operation of the LAN. Because the DHCP process is somewhat random, however, the IP Address assigned by the Gateway becomes even less predictable. It makes troubleshooting more difficult. For example, when a new terminal is installed onto a LAN, it could receive an IP Address assignment that has already been used by another terminal which happened to be not active. Conflict arises in the future when both of these terminals are powered on at the same time. To avoid this unpredictable situation, some Network Managers would rather keep DHCP feature disabled.

Nevertheless, it is interesting to note that among the four sets of Dotted-Decimal parameters that each data processing equipment in a LAN has to have, only the fourth number of a terminal's own "IP Address" is a variable necessary for uniquely identifying it. All of the other numbers are either a fixed template (first three numbers in the "IP Address" and the full "SubNet Mask") of the type of LAN that the terminal belongs to, or the "IP Address" of the "Gateway" and the "DNS" in the same LAN, which are pre-defined because such nodes have to be set up first. So, the task of identifying a data processing equipment can be reduced to the selection of a number between 0 and 255 that is unique within the same LAN. This narrowed scope of task would make the setting of TCP/IP Properties manageable.

It is therefore the object of the present invention to achieve the combined goals of providing a simplified method of specifying a data communication terminal's identity, unifying the address of a workstation consisting of multiple communication capabilities, and easing the tasks of managing a system with multiple nodes of workstations or terminals.

SUMMARY OF THE INVENTION

This document discloses a novel technique that allows an user to set an unified address for all of the networked terminals at each workstation with a method that is easily understandable, changeable and verifyable by ordinary people.

In accordance with my invention, the data link between a data processing equipment and its associated HomePNA adapter is routed through the voice networking control module DPABX at each location. So that, the Extension Number chosen by an user for operating the DPABX can also be utilized to define the IP Address of the data processing equipment. The data processing equipment can obtain this Extension Number and update its own TCP/IP Properties, as frequently as desired. So that, the address identification of a data processing equipment is always in synchronism with the Extension Number set by the user of the voice communication instrument.

Note that the technique disclosed here is realizable with the currently available technology while preserving the unique characteristics of being modular and peer-to-peer, both are essential ingredients for a product that is intended for the mass consumers.

Compared with the current art of identifying a data processing equipment in a LAN, my invention eliminates the "mystery" about the subject and advances data equipment networking closer to be end-user ready. Furthermore, my invention realizes the so-called CTI (Computer & Telephony Integration) in a modular fashion.

BRIEF DESCRIPTION OF THE DRAWINGS

FIG. 3 is an example of TCP/IP Properties that a data terminal may possess.

DESCRIPTION OF THE PREFERRED EMBODIMENT

Figure 1:
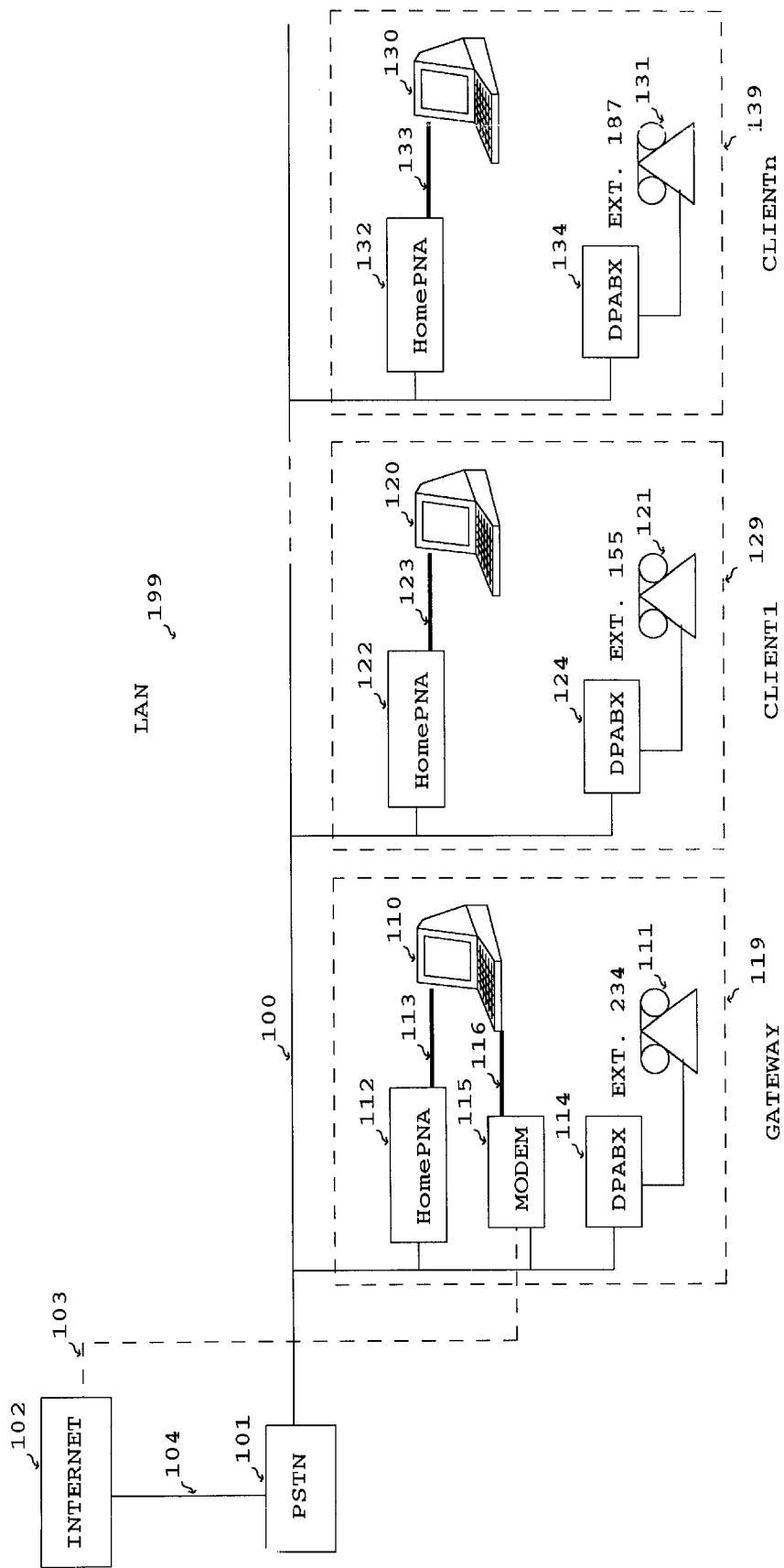
FIG. 1 presents the basic environment that the current invention is applicable.

FIG. 1 depicts the basic architecture of several workstations in a SOHO environment networked through a telephone line 100 which is extended from PSTN 101. As a well known practice in the art, telephone line 100 could be branched, tapped or extended to reach all of the devices at each workstation as long as the electrical connectivity is maintained.

The workstations consist mainly of, by way of representation, Data Processing Equipments 110, 120, . . . 130 and Telephone Station Instruments 111, 121, . . . 131, respectively.

The Data Processing Equipments 110, 120, . . . 130 are connected to the telephone line 100, via data links 113, 123, . . . 133 and by means of HomePNA Adapters 112, 122, . . . 132, respectively, to form a LAN 199 for data communication. HomePNA Adapters 112, 122, . . . 132 are commercial implementation of U.S. Pat. No. 5,696,790. The data links 113, 123, . . . 133 are one of the standard cable connections, such as USB (Universal Serial Bus), commonly used with Personal Computer (PC) products. Thus, they are not detailed here.

The Telephone Station Instruments 111, 121, . . . 131 are connected to telephone line 100 via DPABX Controllers 114, 124, . . . 134, respectively, to form a DPABX network for voice communication. DPABX Controllers 114, 124, . . . 134 are commercial implementation of U.S. Pat. No. 5,596,631. Thus, they are not detailed here.

For the voice network to function properly, each of the DPABX Controllers 114, 124, . . . 134 is given an unique Extension Number by setting the "ID Switches" (Box 241 of FIG. 5 in U.S. Pat. No. 5,596,631). As in any PABX, the Extension Numbers could be any convenient length, provided that they are uniform throughout the system and each is only assigned to one application. This convention is known in the art as "numbering plan". For the purpose of matching with the convention (numbers from 0 to 255) in identifying Data Processing Equipments 110, 120, . . . 130, while avoiding the leading "0", DPABX Controllers 114, 124, . . . 134 are arbitrarily given Extension Numbers 234, 155, . . . 187 for the following discussion.

Data Processing Equipment 110 is also equipped with a data modem 115 for communication to the other data equipment in Internet 102. The data traffic from Internet 102 on telephone line 100 can be transmitted through data link 116 to Data Processing Equipment 110. Where it can go on through data link 113, HomePNA Adapter 112 to reach telephone line 100 again, but at a different frequency, ready to be distributed to other Data Processing Equipments 120, . . . 130 via HomePNA Adapters 122, . . . 132, respectively. Thus, Data Processing Equipment 110 and associated device cluster is referred to as the "Gateway" for LAN 199. Devices associated with Data Processing Equipment 120, . . . 130 are referred to as CLIENT1, . . . CLIENTn, respectively. This technology, generally referred to as "Internet sharing", is well known in the art. Thus, the details are not discussed here.

There are several variations in implementing modem 115:

A. As shown in FIG. 1, modem 115 is basically an analog modem, such as V.90 with transmission speed up to 56 Kbps. And, the data link 116 would be a standard serial (RS-232) cable. This is commonly referred to as an external analog modem to a PC which utilizes telephone line 100 through PSTN 101 to access Internet 102 via data link 104.

B. Modem 115 could be a DSL (Digital Subscriber Line) modem, which also operates on standard telephone line 100. However, to support higher data throughput available from DSL, the data link 116 would be an Ethernet type of cable.

C. Modem 115 may be constructed with one of several other technologies, such as coaxial cable, radio, fiber optics or satellite. If one of these is utilized, the connection between the modem 115 and the Internet 102 would no longer rely on the telephone line 100. The dotted line 103 depicts such data paths. For these cases, much higher data transmission speed is possible. The data link 116 is most likely an Ethernet cable or equivalent.

Note that all of these variations in Gateway's Internet access facility do not affect the workstation identification subject of the current invention. They are presented here for the completeness of the networking system overview.

Since HomePNA Adapters 112, 122, . . . 132 could be physically built inside of Data Processing Equipments 110, 120, . . . 130, respectively, a more general terminology "Data Terminal" will be used to refer to such combinations. In addition, Modem 115 could be built inside of Data Processing Equipment 110. Thus, when the term "Gateway" is used, it would also include Modem 115.

Similarly, Telephone Station Instruments 111, 121, . . . 131 could be constructed with DPABX Control Modules 114, 124, . . . 134 inside, respectively. For simplicity in reference in the following discussion, the terminology "Voice terminal" will be used to mean such combinations.

In addition, dotted-lined rectangular boxes, 119, 129, . . . 139, each encompasses one Data Terminal and one Voice Terminal form workstations GATEWAY, CLIENT1, . . . CLIENTn, respectively.

Figure 2:
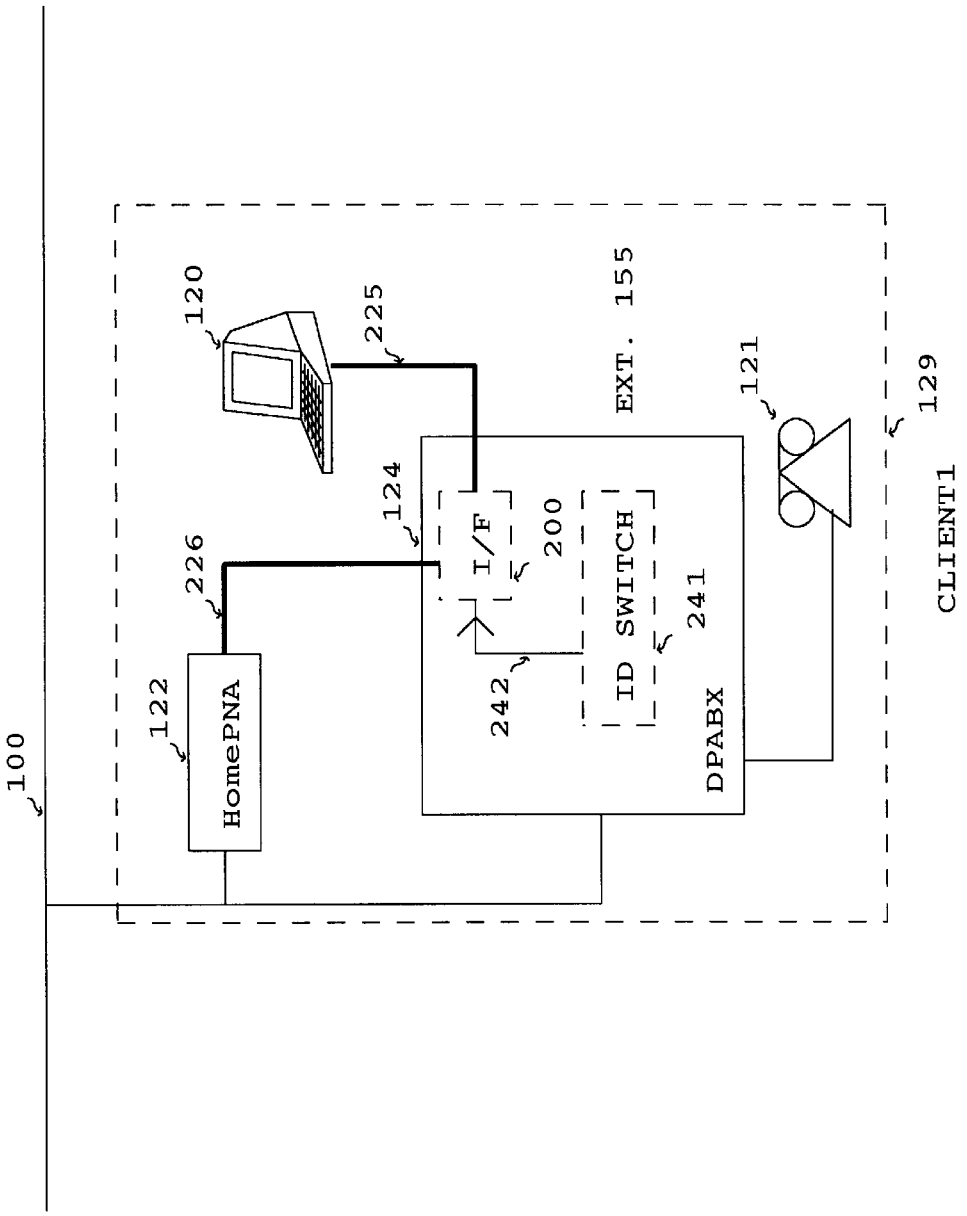
FIG. 2 is a block diagram of the current invention.

FIG. 2 presents a block diagram of the current invention which is accomplished by modifying the subsystem interconnections of a workstation. By way of example, FIG. 2 is a duplicate of CLIENT1 129 in FIG. 1, except that;

A. DPABX Controller 124 is partially "exploded" to show within it, the "ID Switch" 241 and its output data line 242 disclosed by U.S. Pat. No. 5,596,631.

B. An InterFace (I/F) circuit block 200 has been added to the construction of DPABX Controller 124 to make use of the information on signal line 242 from ID Switch 241.

C. Data link 123 has been replaced by two new data links. Data link 225 goes between Data Processing Equipment 120 and I/F 200. Data link 226 connects I/F 200 with HomePNA Adapter 122. Both of these two new data links are the same type of original cabling, such as USB shown in FIG. 1. Thus, there is no change needed in HomePNA Adapter 122. Similarly, Data Processing Equipment 120 does not need to make any hardware change, either. Except, additional software will be implemented in the Data Processing Equipment 120 to take advantage of the information available through I/F 200.

This arrangement provides Data Terminal 120 the means to read the current value "155" of ID Switch 241. While the combination of data links 225 and 226 through I/F 200 maintains the same functions that the original data link 123 provides.

It would be apparent that with this provision, the only part of the IP Address that is required to uniquely identify Data Terminal 120 can always be the same as the Extension Number used in the Voice Terminal of the DPABX system. Since the Extension Number is user settable and verifyable as disclosed in U.S. Pat. No. 5,596,631, the IP Address of Data Terminal 120 would possess the same characteristics of user-friendliness.

FIG. 3 lists the parameters of Data Terminal 120 as an example for TCP/IP Properties. The following details how would such information be defined for each workstation in FIG. 1:

A. The first three numbers (192.168.0) in IP Address 301, Gateway 303 and DNS 304 are standard prefixes or templates for LANs.

B. The last group of digits "155" 305 for IP Address 301 is obtained from the ID Switches 241 as discussed in FIG. 2.

C. Since decimal "255" is equivalent to "11111111" (eight 1's) in binary numbering system, applying the Subnet Mask 302 with a pattern of "255.255.255.0" 306 through a logic "OR" operation to an IP Address 301 with the value of "192.168.0.155" 305 will "max out" the first three groups of values and leave the fourth unchanged. The only meaningful number in the resulting "255.255.255.155" would be "155" which is unique to CLIENT1 129. This is the same number as Extension "155" in DPABX for the voice networking. Thus, an unified address identification system for a workstation consisting of both Voice and Data Terminals is realized.

D. The values of Gateway Address 307 and DNS Address 308 are both pointing to Gateway 119 with workstation identification "234", as specified by the value of the fourth group of digits. The "234" in Gateway IP Address 307, is preset by implementing the same subsystem interconnect arrangement in the Gateway 119.

During operation of the proposed workstations, the value defined by ID Switch 241 can be read by local Data Terminal 120 to set its own IP Address 301. This can be done at various opportunities:

A. Initial installation of a networking software to a data processing equipment.

B. Upon each restart or power-on of a data processing equipment and,

C. Prior to initiating an active communication session.

Since a workstation's identification in a LAN should be unique, simple software can be installed in all Data Terminals to scan for conflicts with IP Addresses that are already active in the LAN. When duplication is detected, the Data Terminal shall terminate the attempt to connect to the LAN, and sets off a local alarm for the user to resolve the conflict.

Because the IP Address 301 is controlled by the ID Switch 241 of the Voice Terminal, a quick review of the company telephone directory or an intercom test call would clarify the situation. A corrective measure of setting the ID Switch 241 to an unused combination would allow the Data Terminal to proceed with its LAN log-on process.

Many variations of my invention are possible. For example, instead of using physical switches to set the Extension Numbers for Voice Terminal, it is possible to use the dial keypad on the telephone station instrument for specifying these numbers. The stored numbers could be confirmed by visual displays such as LCD (Liquid Crystal Display) or synthesized voice that may be equipped in the station instrument.

For simplicity in presenting this invention, 3 digit numbers within the range from 100 to 255, inclusive, are used in the Figures. These give a set of 156 possible choices. For a smaller system, 2 digit number set ranging from 10 to 99, inclusive, can be used giving a choice of 90 combinations. For user convenience in a very small deployment, such as single family residences, single digit identification system with 9 choices (numbers among 1–9, inclusive) could be utilized. In all of these cases, address "0" is reserved for "Operator".

For larger business, 4 or 5 digit extension number may be in use. Some of them start with the same first couple of digits. So, it is not necessary to incorporate such digits in the IP Address. On the other hand, there is enough capacity in the IP Address notation to take care of this. That is, the third group of digits ("0" in the example) in IP Address can be used to expand its capability to encompass the extension numbers in a larger DPABX system. The handling of this expanded numbering system would be a very similar manner as disclosed.

For clarity, my invention has been presented with separate Data Processing Equipment, HomePNA Adapter, DPABX Controller, Telephone Station Instrument, modem, etc. for each workstation. Since all of the communication modules of one workstation are connected to the same telephone line, it would be natural to have all of the modules built into one common enclosure with only one single connection remaining to be plugged into Telephone Line 100. The identities of separate modules will no longer be visible externally, and the respective functions may be re-assigned to different subsystems for implementation efficiency and economy. For example, the unified address could even be specified through the data processing equipment's keyboard, and confirmed through its display screen. It should be noted, however, the spirit of my invention would still apply.

Analog voice networking through DPABX telephone system and digital data networking via HomePNA are utilized in presenting my invention. They may appear to be two dis-jointed technologies for different types of communications. Due to the fast advance of digital technology, it has begun to carry voice telephony traffic. As a matter of the fact, video signals can be carried through digital system as well. Thus, more choices of communication modes, such as VoIP (Voice over Internet Protocol), VoDSL (Voice over Digital Subscriber Line) etc., are available to an user. For example, additional digital technology based telephony channels could be accessed through a workstation with a configuration disclosed here. However, natural communication among humans is via analog voice. So, by virtue of its simplicity in man-machine interface, DPABX would continue to serve as the foundation in building up and maintaining such a multi-facet communication system.

My invention has been presented based on traditional telephone line as the LAN and DPABX transmission medium. It should be noted that my technique is not restricted to any particular transmission technology. The key essence is the setting of a terminal equipment's identification with a human-friendly method. The concept is equally applicable to other networks, be it based on coax cable, fiber optics, radio or satellite. Furthermore, my invention can be applied to workstations using different media for data and voice transmissions. The method of applying unified terminal identification to all devices at the same physical location is independent of multiple transmission media in network.

In the disclosed LAN, workstations without the need for DPABX capability could be deployed with "degenerate or subset" version of the recommended IP Address, as long as the ID Switch 241 facility is incorporated. That is, the IP Address used could be outside of the range of the numbering plan defined for the DPABX. For example, for the LAN shown in the Figures, all numbers from 1 to 99 inclusive, are available for this purpose, because the DPABX operates with a 3-digit numbering plan.

This subset of numbers can be applied to service devices, such as a printer or an appliance whose identification codes are most likely not to change after setup. Of course, the choice of this kind of IP Address number has to be handled with careful control and documentation to avoid conflicts, very much like the traditional procedures that a Network Manager has to follow.

This invention has been described with particular attention to its preferred embodiment. It should be understood that variations and modifications within the spirit and scope of the invention may occur to those skilled in the art to which the invention pertains.

What is claimed is:

1. A network of at least a pair of workstations, each said workstation comprising:

a voice terminal being selected with an extension number, configured by a first code, by a user for communication and identification among said voice terminals;

a data terminal being assigned with an IP address, having first and second numbers, for communication and identification among said data terminals; and wherein a unified identification code in said voice and data terminal is arranged by combining said IP address and extension number together in a manner such that said second number of the IP address is completely identical to said first code.

2. A network of workstations in accordance with claim 1, wherein validity of said IP address is verified by said user from said voice terminal.

3. A network of workstations in accordance with claim 1, wherein validity of said IP address is managed by said user from said voice terminal.

4. A network of workstations in accordance with claim 1, wherein said IP address of said data terminal is updated by said user selecting a new said extension number for said voice terminal.

5. A network of workstations in accordance with claim 1, wherein said unified identification code realizes so-called CTI (Computer & Telephony Integration) without relying on a central facility.

6. A network of workstations in accordance with claim 1, wherein said unified identification code technique is independent to network transmission technology.

7. A network of workstations in accordance with claim 1, wherein conflicts among said IP address is avoided by a simple test procedure of making an intercom call between said voice terminals.

8. A network of workstations in accordance with claim 1, wherein the length of said unified identification code is determined by the need of said voice terminals.

9. A network of workstations in accordance with claim 1, wherein said workstation may comprise only said data terminal, as long as it has means to access and to utilize said unified identification code.

10. A network of workstations in accordance with claim 9, wherein said data terminal may use portion of said unified identification code that is outside of a numbering plan used by said voice terminal.

11. A method for selecting a unified identification code applied to voice and data terminals of a workstation system, comprising the steps of:
1) providing a plurality of voice terminals capable of communicating with one another within a PBX system, each said voice terminal being designated with a first code having a first number;
2) providing a plurality of data terminals each being associated to a corresponding said voice terminal and interconnected to a LAN system, each said data terminal being designated with a second code having at least second and third numbers;

wherein said third number of said second code of said associated data terminal is selected such that said third number is completely identical to said first number of said first code of said voice terminal.

12. A voice and data networking system, comprising:
a plurality of voice terminals capable of communicating with one another within a PBX system, each said voice terminal being designated with a unique first code, said voice terminal being intercommunicated among a PBX system;
a plurality of data terminals each being associated to a corresponding said voice terminal and designated with a unique second code having at least first and second numbers, said data terminal being interconnected to a LAN system;

means for selecting said first and second codes of said voice and said associated data terminals;

wherein said second number of said second code of said associated data terminal is selected by said means such that said second number of said second code is completely identical to said first code of said voice terminal.

13. A method for verifying IP address in a LAN, comprising the steps of:
1) providing a plurality of voice terminals capable of communicating with one another within a PBX system, said voice terminal being designated with a first code having a first number;
2) providing a plurality of data terminals each being interconnected to a LAN system, each said data terminal being associated to a corresponding said voice terminal and designated with an IP address having at least second and third numbers;
3) selecting said third number of said IP address of said associated data terminal such that said third number is completely identical to said first number of said first code of said voice terminal; and
4) dialing said first number of said first code among said PBX system to verify said first number is not repeated within said PBX system thereby verifying said IP address is not repeated within said LAN system.

* * * * *